US012749052B2

(12) United States Patent
Peace et al.

(10) Patent No.: US 12,749,052 B2
(45) **Date of Patent: *Sep. 29, 2026**

(54) SYSTEMS AND METHODS FOR PROVIDING ACH TRANSACTION NOTIFICATION AND FACILITATING ACH TRANSACTION DISPUTES

(71) Applicant: Alkami Technology, Inc., Plano, TX (US)

(72) Inventors: Deborah Peace, Harrison, TN (US); David Peace, Harrison, TN (US)

( * ) Notice: Subject to any disclaimer, the term of this patent is extended or adjusted under 35 U.S.C. 154(b) by 1125 days.

This patent is subject to a terminal disclaimer.

(21) Appl. No.: 17/335,302

(22) Filed: Jun. 1, 2021

(65) Prior Publication Data

US 2021/0357881 A1 Nov. 18, 2021

Related U.S. Application Data

(63) Continuation of application No. 16/174,734, filed on Oct. 30, 2018, now Pat. No. 11,023,866, which is a continuation of application No. 13/473,431, filed on May 16, 2012, now Pat. No. 10,115,106, which is a continuation of application No. 13/108,306, filed on May 16, 2011, now Pat. No. 8,219,491, which is a continuation of application No. 12/347,847, filed on Dec. 31, 2008, now Pat. No. 7,974,893.

(60) Provisional application No. 61/105,588, filed on Oct. 15, 2008, provisional application No. 61/019,166, filed on Jan. 4, 2008.

(51) Int. Cl.

*G06Q 20/02* (2012.01)
*G06Q 20/38* (2012.01)
*G06Q 20/40* (2012.01)
*G06Q 40/02* (2023.01)

(52) U.S. Cl.

CPC ......... *G06Q 20/023* (2013.01); *G06Q 20/388* (2013.01); *G06Q 20/4016* (2013.01); *G06Q 40/02* (2013.01)

(58) Field of Classification Search

None

See application file for complete search history.

(56) References Cited

U.S. PATENT DOCUMENTS 7,716,077 B1 * 5/2010 Mikurak ............ G06Q 10/0631 705/7.12
7,958,030 B2 * 6/2011 Kemper ............... G06Q 20/102 705/40
2005/0097037 A1 * 5/2005 Tibor ..................... G06V 40/30 705/64

(Continued)

*Primary Examiner* — Chrystina E Zelaskiewicz

(74) *Attorney, Agent, or Firm* — KLEMCHUK PLLC

(57) ABSTRACT

A system and method for identifying incoming ACH transactions involving subscriber accounts at a financial institution, comparing the ACH transaction details with preset notification criteria, suspending any ACH transaction that satisfy the preset criteria so that the transaction does not post to the account, notifying the subscriber of the incoming ACH transaction, providing the subscriber with the option to either authorize or dispute the ACH transaction, and facilitating the dispute process according to applicable banking rules by requesting further information from the subscriber and forwarding the dispute information to the ACH operator.

17 Claims, 3 Drawing Sheets

(56) References Cited

U.S. PATENT DOCUMENTS

2006/0212407 A1* 9/2006 Lyon .................. G06Q 20/4014
705/71
2008/0046366 A1* 2/2008 Bemmel ................ G06Q 40/12
705/44

* cited by examiner

SYSTEMS AND METHODS FOR PROVIDING ACH TRANSACTION NOTIFICATION AND FACILITATING ACH TRANSACTION DISPUTES

This application claims priority and is a continuation of US Non-provisional Application No. U.S. Pat. No. 16,174,734 which issued on Jun. 1, 2021 as U.S. Pat. No. 11,023,866, which is a continuation of US Non-provisional Application No. 13,473,431 which issued on Oct. 30, 2018 as U.S. Pat. No. 10,115,106, which is a continuation of U.S. Non-provisional application Ser. No. 13/108,306 which issued on Jul. 10, 2012 as U.S. Pat. No. 8,219,491, which is a continuation of US Non-provisional application Ser. No. 12/347,847 which issued on Jul. 5, 2011 as U.S. Pat. No. 7,974,893, which claims priority to provisional patent application Ser. No. 61/105,588, filed on Oct. 15, 2008 and provisional patent application Ser. No. 61/019,166, filed on Jan. 4, 2008, the disclosures of which are incorporated herein by reference.

BACKGROUND OF THE INVENTION

Field of the Invention

The subject disclosure is directed to systems and methods for facilitating ACH transactions and ACH transaction disputes.

Background of the Related Art

The Automated Clearing House (ACH) is an electronic payment network used by individuals, businesses, financial institutions and government organizations to electronically debit or credit funds to an account. Electronic ACH payments are generally preferred over traditional paper checks because they provide better cash management capabilities, are quicker to complete and have lower associated costs.

The ACH network is used to transfer finds throughout the 50 states as well as in U.S. territories and Canada with participation by over 98% of the nation's financial institutions, including thousands of savings banks and credit unions. In addition, efforts are underway for the development of a worldwide ACH Network, known as the Worldwide Automated Transaction Clearing House (WATCH).

ACH transactions are forwarded along with pertinent information such as the individual or company name, financial institution routing number, account number, amount and effective date for the transaction.

Typically, these transactions begin upon one company or individual (receiver) authorizing another company or individual (originator) to initiate a ACH transaction to their financial institution account. The originator prepares information about the ACH transactions and passes it along to an Originating Depository Financial Institution (ODFI). The ODFI collects and consolidates the information regarding the ACH transactions and presents it to an ACH Operator. The ACH Operator processes the ACH transaction information from submitting ODFIs and distributes it to the appropriate Receiving Depository Financial Institutions (RDFIs). Each RDFI receives entries for its customer accounts and posts entries on the settlement date.

Thus, incoming ACH transactions are picked up by the RDFI and/or their Processor from the ACH Operator and then processed by the core banking system for posting to the appropriate accounts. Account holders (corporate & consumer) typically see that an ACH transaction has occurred or posted to their account by reviewing a periodic account statement. Thus, if the transaction was a debit, the corresponding funds are removed as of the settlement date. It should be readily apparent that an unauthorized or unexpected ACH transaction may deplete the account without warning, possibly resulting in overdrafts, non-sufficient funds (NSF) fees and damaged relationships.

The advent of online and mobile banking provides account holders with the ability to check ACH activity without waiting for periodic statements. However, such notification is essentially equivalent to receipt of an "early" periodic statement, since any ACH transactions shown will have already posted (i.e., the funds will have already been debited). Thus, the account holder is still without immediate recourse in the case of an unauthorized or unexpected ACH transaction.

Financial institutions have the capability to block all ACH transaction activity from posting to an account holder's account. However, account holders are thus precluded from accepting any ACH transactions, including authorized ACH transactions.

In summary, no known prior alternative exists for filtering and suspending ACH transactions, prior to posting, based on rules established by the receiving depository financial institution and/or their account holder. While prior alternatives exist for notification of electronic transactions via email, cell phone text message, voice response systems (VRU), fax and/or pager, none of these alternatives specifically address notification of ACH transactions, after they occur but before they post, or enable the account holder to respond to the notification to provide return instructions and electronically complete the written statement under the penalty of perjury (WSUPP) or otherwise contest the charge if the transaction is unauthorized.

Prior alternatives for allowing participating depository financial institutions to exchange request for authorizations, provide proof of authorizations and written statements under the penalty of perjury have been via phone, fax or mail. The timelines established by National Automated Clearing House Association (NACHA) for exchanging the information between parties make these methods inefficient, unreliable and costly.

Thus, there is a compelling need in the at for a system that can suspend an ACH transaction while the account holder is notified of the transaction details, provide the account holder with the option to authorize or decline the transaction, and facilitate the automatic creation of a return entry and transaction dispute process in a timely manner.

SUMMARY OF THE INVENTION

Some embodiments of the invention provide a system and method for identifying incoming ACH transactions involving subscriber accounts at a financial institution, comparing the ACH transaction details with preset notification criteria, suspending any ACH transaction that satisfy the preset criteria so that the transaction does not post to the account, notifying the subscriber of the incoming ACH transaction, providing the subscriber with the option to either authorize or dispute the ACH transaction, and facilitating the dispute process according to applicable banking rules by requesting further information from the subscriber and forwarding the dispute information to the ACH operator.

In some embodiments, the system and method includes a filtering mechanism to strip out and suspend eligible ACH transactions for the purpose of notifying the account holder same day and allowing the account holder to accept or reject the transaction in an automated fashion.

Some embodiments also provide the ability to automatically reject a transaction, provide the reason for the rejection, have the system create the return transaction and obtain and complete an electronic written statement under the penalty of perjury (WSUPP).

Some embodiments further provide for storing the WSUPP, accepting and delivering requests for authorization, proof of authorization and an alert system for automatically notifying the originating depository financial institutions (ODFI) and receiving depository financial institutions (RDFI) when relevant deadlines are approaching.

Some embodiments provide a method of protecting account holders against fraudulent transactions, which includes the steps of receiving an election of notification criteria from an account holder through a data input device, wherein the notification criteria relates to characteristics of financial transactions that involve an account in a financial institution; receiving transaction data through the data input device wherein the transaction data is associated with an underlying transaction involving the account; comparing the transaction data with the notification criteria elected by the account holder; suspending the underlying transaction associated with the transaction data if the notification criteria is satisfied, wherein suspension prevents the transaction from affecting the account; notifying the account holder of the underlying transaction associated with the transaction data; and querying the account holder as to whether the underlying transaction is disputed, wherein further information as required by any applicable rules is requested from the account holder if a dispute of the underlying transaction is indicated by the account holder.

The underlying transaction may be an ACH transaction and the transaction data may include the amount of money involved in the underlying transaction, the parties involved in the underlying transaction and an SEC code associated with the transaction, among other things.

In some embodiments, the aforementioned method further includes the steps of providing a listing of characteristics relating to transactions to the account holder, and receiving an election of listed characteristics from the account holder.

In some embodiments, the aforementioned method further includes the step of storing the elected notification criteria in a database. The notification data may also prescribe the means by which the account holder is to be notified.

In some embodiments, the aforementioned method further includes the step of querying the account holder as to whether the underlying transaction is authorized, wherein the underlying transaction is unsuspended if authorization is received from the account holder.

In some embodiments, the aforementioned method further includes the steps of querying the account holder as to whether transactions of substantially similar characteristics are to be automatically authorized in the future, receiving a response by the account holder, wherein the response includes an election of characteristics, and changing the notification criteria based on the election of characteristics in the response.

In some embodiments, the aforementioned method includes the steps of determining whether an underlying transaction involves an account holder having elected notification criteria, and permitting the transaction to proceed if the transaction involves an account holder without elected notification criteria.

In some embodiments, the aforementioned method further includes the steps of receiving the further information requested from the account holder, formatting the further information received pursuant to any applicable rules, and transmitting the formatted information to the sender of the transaction data.

Some embodiments provide a system of protecting account holders against fraudulent transactions, which includes a data input device configured for receiving an election of notification criteria from an account holder and receiving transaction data through the data input device, among other things; a data processing device configured for comparing the transaction data with the notification criteria elected by the account holder and suspending the underlying transaction associated with the transaction data if the notification criteria is satisfied, among other things; a data output device configured for notifying the account holder of the underlying transaction associated with the transaction data and querying the account holder as to whether the underlying transaction is disputed, among other things.

In some embodiments, the aforementioned system further includes a database for storing the elected notification criteria and any further information received from the account holder.

Some embodiments provide a method of providing transaction processors with an ACH transaction alerting system, which includes the steps of receiving elections of notification criteria relating to a financial account managed by a financial institution and held by an account holder, receiving transaction data from a sender wherein the transaction data is associated with an underlying transaction involving the financial account; comparing the transaction data with the notification criteria relating to the financial account; suspending the underlying transaction associated with the transaction data if the notification criteria is satisfied, wherein suspension of the underlying transaction prevents the transaction from posting to the financial account; notifying the account holder of the underlying transaction associated with the transaction data; querying the account holder as to whether the underlying transaction is disputed, wherein if the transaction is disputed, then further information is requested from the account holder regarding the reason for disputing the transaction; permitting the underlying transaction to post to the financial account if the further information requested is not received within a preset period of time; and transmitting the reason for disputing the transaction to the sender of the transaction data.

In some embodiments, the aforementioned method further includes the step of querying the account holder as to whether the underlying transaction is authorized, wherein the underlying transaction is unsuspended if authorization is received from the account holder.

Some embodiments are directed to a computer program product, which includes a computer usable medium having a computer readable program code embodied therein adapted to be executed to implement a method for protecting account holders against fraudulent transactions. The computer readable program code can be configured for some or all of the following: providing an interface for an account holder to submit notification criteria, wherein the notification criteria relates to characteristics of financial transactions that involve an account in a financial institution and the account holder's notification preferences; analyzing incoming transaction data, wherein the transaction data is associated with an underlying financial transaction involving the account; comparing the transaction data with the notification criteria; notifying the account holder of the underlying transaction according to the notification preferences if the underlying transaction satisfies the notification criteria; providing an interface configured for querying the account holder as to whether the underlying transaction is disputed and receiving a response thereto; providing an interface for querying the account holder to obtain dispute information required by any applicable rules if a dispute of the underlying transaction is received by the account holder and receiving a response thereto; releasing the transaction data to the financial institution if the underlying transaction is not disputed by the account holder; and releasing the dispute information to the financial institution to facilitate the dispute process.

These and other aspects of the system and method of the subject invention and some embodiments thereof will become more readily apparent to those having ordinary skill in the art from the following detailed description of the invention and some embodiments thereof taken in conjunction with the drawings.

BRIEF DESCRIPTION OF THE FIGURES

So that those having ordinary skill in the art to which at least some embodiments of the invention pertains will more readily understand how to make and use systems and methods in accordance therewith, such embodiments thereof will be described in enabling detail herein below with reference to the drawings, wherein.

DETAILED DESCRIPTION OF THE INVENTION

Some embodiments of the invention disclose a new and useful tool for facilitating ACH transactions and disputes of unauthorized ACH transactions, among other things, which may be used in conjunction with a computerized banking system.

Those skilled in the art will readily appreciate that a system in accordance with some embodiments of the invention may include various computer and network related software and hardware, that is, programs, operating systems, memory storage devices, data input/output devices, data processors, servers with links to data communication systems, wireless or otherwise, such as those which take the form of a local or wide area network, and a plurality of data transceiving terminals capable of interfacing with the network, such as personal computers, handheld devices, personal digital assistants (PDAs), cellphones or any other devices capable of displaying a graphical user interface.

Those skilled in the art will further appreciate that the particular types of communication network and devices, software and hardware are not vital to the full implementation of the embodiments described herein or other embodiments within the scope and spirit of the invention. It should be further understood that the type of communication network and devices, software and hardware may also vary based on the rapid advances in technology that are ongoing in the industry. In other words, the precise software and hardware configuration of the various embodiments of the invention may vary accordingly while still remaining within the scope and spirit of the invention.

For purposes of illustrating the features of some embodiments of the invention, the exemplary embodiments are described herein as being operated or hosted by a financial institution, and in particular, a financial institution that is designated as a "Receiving Depository Financial Institution" or RDFI. It should be understood that the operation of the method of some embodiments of the invention by such an entity is exemplary of the type of setting for which some embodiments of the invention are well-suited. Furthermore, it should be further understood that, depending on the context, an RDFI in one transaction may function as an ODFI in another transaction. Those skilled in the art will readily appreciate that the method of some embodiments of the invention may be operated by other entities, third parties, either in part or wholly integrated with other systems or used in other configurations within the spirit and scope of some embodiments of the invention.

For example, the system and method of some embodiments of the invention may be accessible for operation by a plurality of RDFIs through a communication network such as the world wide web while being hosted and maintained by an independent party at a separate location.

Figure 1:
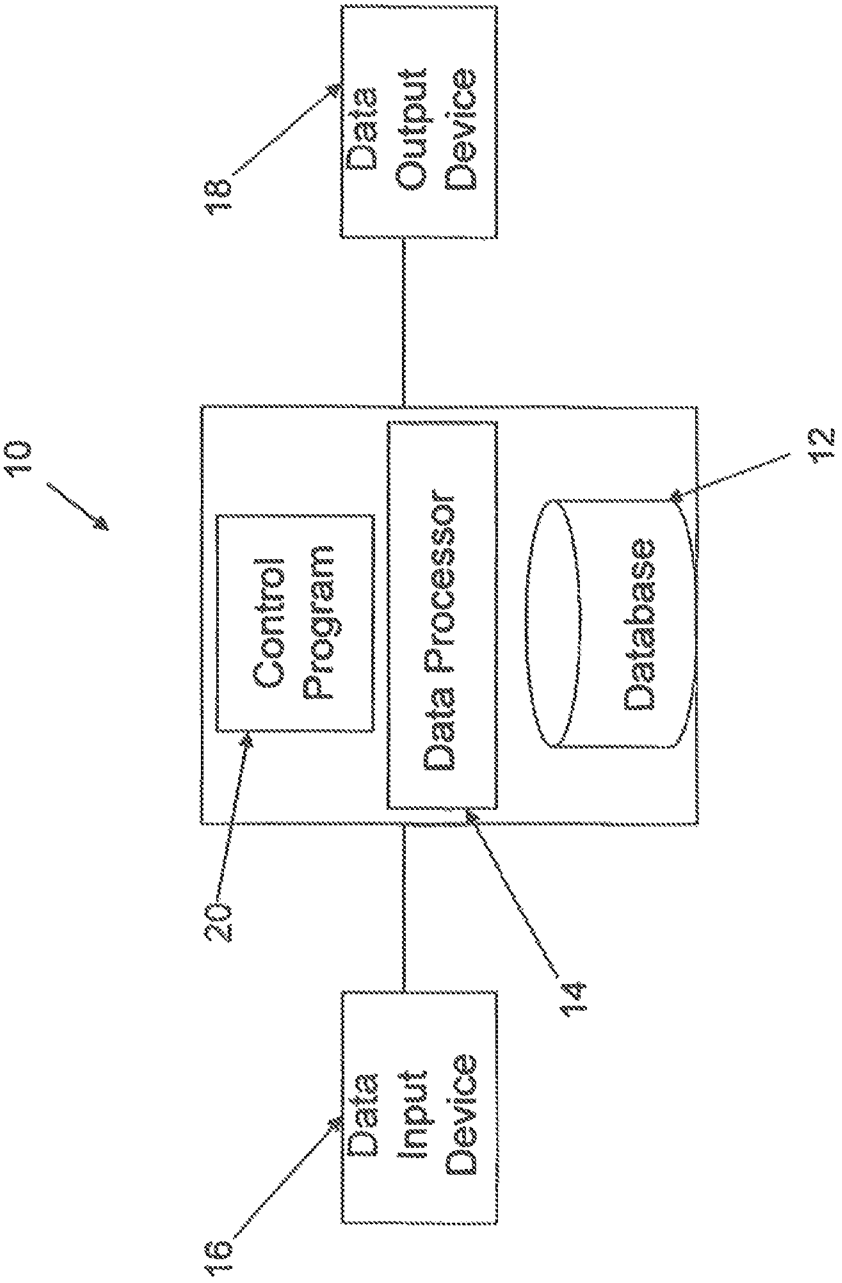
FIG. 1 is a schematic representation illustrating some of the core functional components of a system constructed in accordance with some embodiments of the invention.

Referring now to the drawings wherein FIG. 1 illustrates some of the core functional components of an exemplary system constructed in accordance with some embodiments of the invention and designated generally by the reference numeral 10. System 10 includes a data storage device or database 12, a data processor 14, a data input device 16, and a data output device 18. Each of these components of system 10 are operatively associated with one another via control program 20 and configured for managing communication and the flow of data through system 10, and processing of the data as necessary to implement the method of some embodiments of the invention.

As mentioned above, with the continuous and ongoing improvements in computer and electronic technology, many modifications may be made to the specific nature of hardware and/or software components required. Accordingly, one of skill in the art may select any hardware components that would rapidly and efficiently process the data and provide storage and communication as needed for the successful operation of some embodiments of the invention. For example, there may be a plurality of any of the components of system 10, such as multiple databases 12, processors 14, data input devices 16, data output devices 18, or programs 20.

Also, one or more of the system 10 components may have multiple uses, such as a combined data input/output device. Also, one or more components may be hosted, reside, or otherwise integrated with another system, such as program 20 being part of a computer system maintained by one or more financial institutions (such as RDFIs) or their transaction processors, which may be initially installed via an outside connection such as the Internet or world wide web and periodically updated as necessary, while the database 12, or portions of database 12, or other components of the system of some embodiments of the invention may be located separately and managed by an independent party for more than one financial institution.

Figure 2:
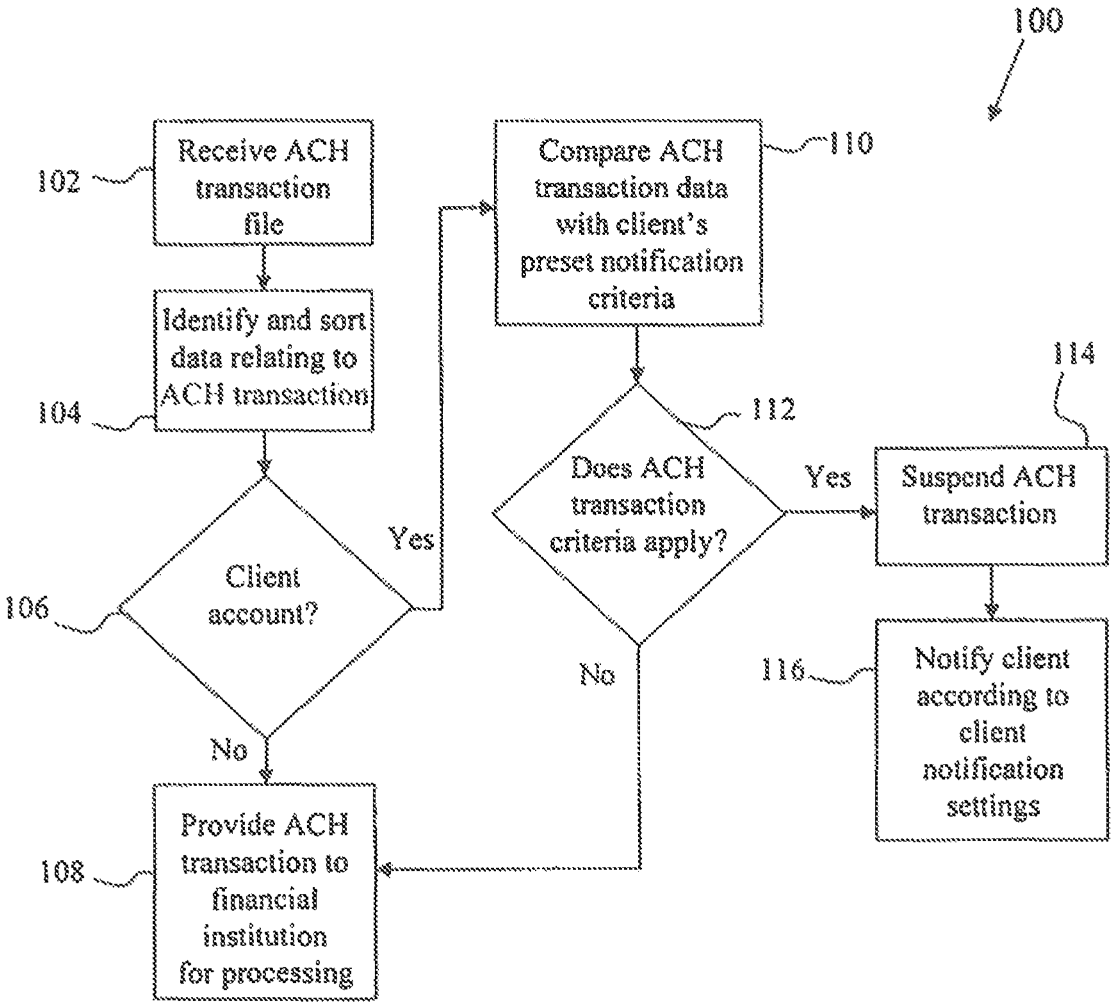
FIG. 2 is a flow diagram depicting a portion of the operational steps employed by a system and method formed in accordance with some embodiments of the invention, illustrating in particular, an exemplary ACH transaction Intake, identification and suspension process, among other things.
Figure 3:
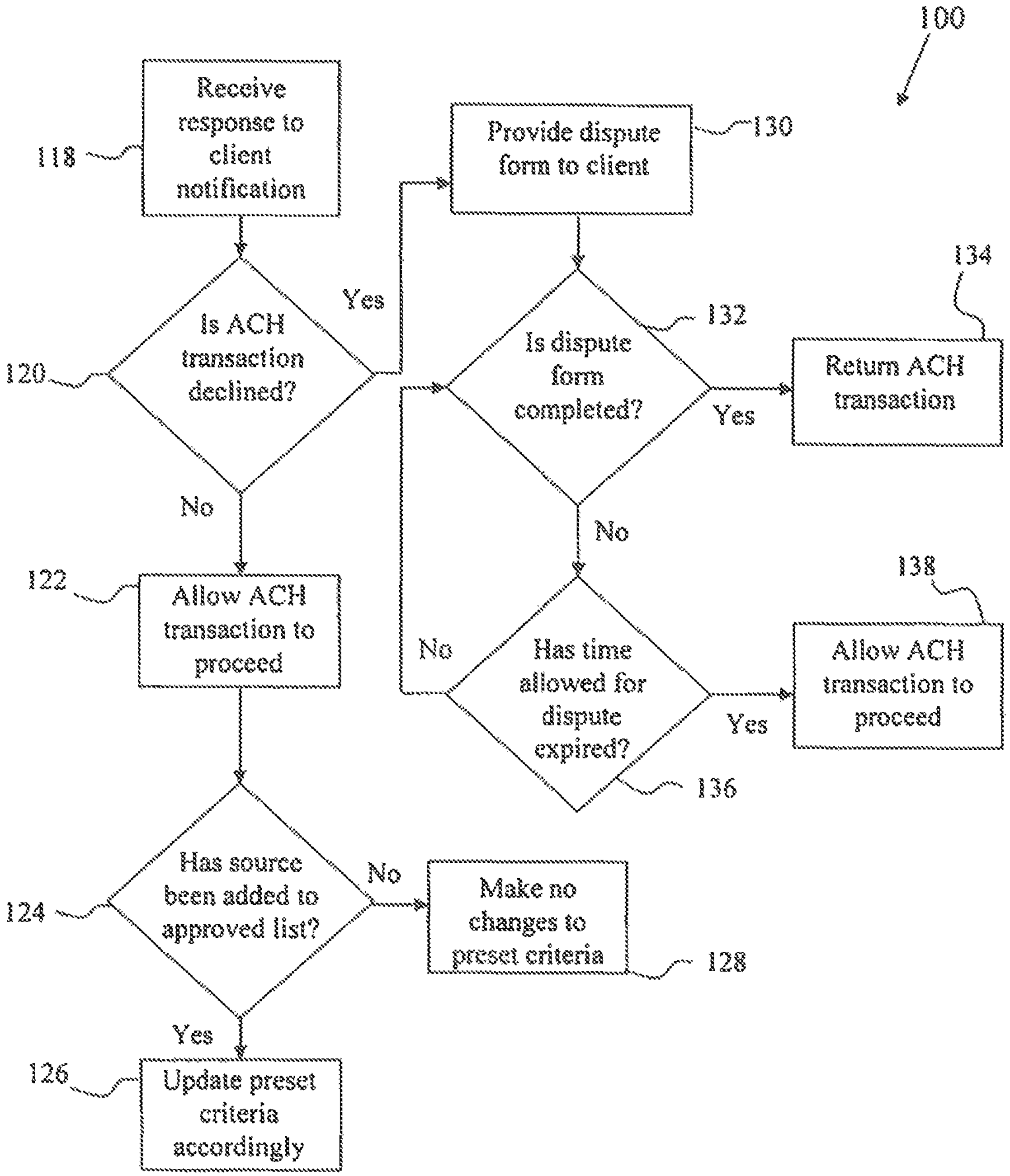
FIG. 3 is a flow diagram depicting a portion of the operational steps employed by a system and method in accordance with some embodiments of the invention, illustrating in particular, an exemplary pending ACH transaction notification and dispute facilitation process, among other things.

FIGS. 2-3 provide process flow diagrams which illustrate operational steps employed by an exemplary embodiment of the method of the invention. For illustrative purposes and convenience, the process steps will be described in conjunction with the exemplary system embodied by system 10 as shown in FIG. 1.

Referring now to FIG. 2, a flow diagram generally referred to by the reference numeral 100 illustrates an exemplary process according to some embodiments. An ACH transaction file is generated when an ACH operator and debit card processor initiate an ACH transaction intended to debit a customer's account with an RDFI. The RDFI associated with the customer's account, among other things, is identified, and transmission of the ACH transaction file would be received by data input device 16 at step 102.

In some embodiments, step 102 further involves system 10 generating and/or recording various data relating to the received ACH transaction file for storage in database 12. For example, the ACH transaction may be given a unique identification code, the date/time of its receipt may be recorded and a copy of the ACH transaction file may be added to a transaction history file maintained by system 10 in database 12.

At step 104, system 10, via control program 20 and processors 14, analyzes the ACH transaction file. In this embodiment, any non-ACH transactions are not considered by system 10. However, in other embodiments, system 10, or a system and method such as those discussed herein, may advantageously be employed for handling various electronic transactions in the same manner as ACH transactions.

In this embodiment, system 10 sorts the data and identifies information relating to the transaction. For example, system 10 may identify the customer or account holder involved, the account number and corresponding financial institution, the time and date of the transaction, the amount of the transaction, the originator (which may be a merchant or Point of Sale (POS) where the transaction occurred), the type of transaction, or any other identifying characteristic. In some embodiments, system 10 may be configured to remove some transactions immediately from consideration based on characteristics relating to the underlying transaction or transaction file. For example, system 10 may remove transaction files which have incorrect information or non-conforming data.

System 10 may also be configured to sort and identify the transaction by the National Automated Clearing House Association (NACHA) Standard Entry Class (SEC) code relating to the transaction. Transactions may have SEC codes such as: Cash Concentration or Disbursement (CCD) which is an ACH debit or credit transaction from or to a business account; Point-Of-Purchase (POP) which is used as an ACH debit transaction as a method of payment for the in-person purchase of goods or services by consumers. Prearranged Payment and Deposit (PPD) which includes transactions such as direct deposits and preauthorized bill payments; Re-presented Check (RCK) which is an ACH debit transaction used by ODFI's to re-present a check that has been processed through the check collection system and returned because of insufficient or uncollected funds; Telephone-Initiated Entry (TEL) applies to single entry debit transactions to a consumers account pursuant to an oral authorization obtained from the consumer via telephone; Internet-Initiated Entry (WEB) which is a debit entry to a consumer account initiated by an ODFI pursuant to an authorization that is obtained from the consumer via the Internet; Back Office Conversion (BOC); and Accounts Receivable Truncated Check Debit (ARC) which is an ACH debit of a check received in the mail and converted to an electronic item.

At step 106, control program 20 accesses data from database 12 to determine whether the account involved in the ACH transaction is held by a subscribing account holder. In some embodiments, the account holders must subscribe to methods and systems described herein as a service, which may be provided through their financial institution. In other embodiments, a financial institution may provide the service as a benefit to all account holders.

If for any reason the customer is not a subscribing account holder in step 106, then as shown in step 108 the ACH transaction file will bypass system 10 and be provided directly to the appropriate financial institution (RDFI) or made available to be retrieved by the RDFI, presumably for processing and resolution of the transaction. The processing may involve system 10 preparing a posting file and a return file, which will be retrieved by the RDFI's banking system and sent to the ACH operator, who may in turn transmit the return file to the ODFI involved in the transaction, to effectuate the appropriate credit or debit. The files may be provided immediately to the customer's financial institution or optionally held for a period of time before being released to the financial institution in step 108. If the customer is a subscribing account holder, then as shown in step 110 the transaction data obtained in step 104 will be compared with the account holder's preset notification criteria, which may be stored in database 12, to determine whether the transaction data satisfies any of the criteria for notifying the account holder in step 112.

In some embodiments, the account holder may enter the criteria relating to transactions for which they are to be notified via data input device 16. In some embodiments, typical criteria relating to transactions may be provided by system 10 as a list of options to be elected by the account holder. In some embodiments, account holders may select criteria that correspond with transaction characteristics which may be identifiable from the incoming ACH transaction file in step 104. For example, the preset criteria may relate to the date and time the transaction occurred, the amount of money involved, the originator involved, the type of transaction, whether the transaction involved use of a debit card, and/or the particular SEC code relating to the transaction, or types of transactions which may be deemed higher risk transactions based on one or more characteristics. The preset criteria selected by the account holder is stored in database 12 and used by system 10 to compare against incoming ACH transactions. Within system 10, the preset criteria may be written as computer code or language in any form, such as configurable rules or logic, which may be accessed by control program 20 and processed by processor 14.

In some embodiments, system 10 may also be configured to check the frequency of transactions having the same parameters in ascertaining whether any of the preset criteria has been satisfied. For example, account holders may preset criteria relating to the number of times an ACH transaction is received from a particular originator, and be notified when an ACH transaction is received that equals the designated number.

It is envisioned that account holders may preset the notification criteria so that all ACH transactions are to be suspended until approved. Account holders may then add originators to an approved list so that ACH transactions submitted by such originators will not be suspended. As another example, account holders may preset criteria relating to the number of transactions associated with one or more specific SEC codes, and be notified if an ACH transaction is received that equals the designated number for the specific SEC code.

If in step 112, system 10 discovers that there are no preset notification criteria relating to the ACH transaction in question or the ACH transaction in question does not satisfy any preset notification criteria, then the transaction file or posting file is forwarded to the appropriate financial institution in step 108. If appropriate, a return file is also forwarded to the ACH Operator (who forwards the file on to the ODFI) to ultimately resolve the credit or debit at the RDFI and ODFI of the parties involved in the transaction. However, if in step 112 system 10 finds that there are preset notification criteria which are satisfied by the details or characteristics of the ACH transaction, then the ACH transaction in question may be suspended in step 114 and the account holder is notified of the ACH transaction in step 116 according to the account holder's notification settings. It should be understood that the suspension of the ACH transaction means the transaction will not post to the account, that is, either credit or debit any account in an RDFI or ODFI. In this embodiment, the suspension of the ACH transaction and satisfaction of the preset notification criteria is recognized by system 10, and data regarding the same, which may include the transaction file, is stored in a "centralized warehouse," that is, stored in database 12 or other memory associated with system 10. In other embodiments, the transaction may be allowed to proceed even if the preset notification is satisfied but the account will be credited if the transaction is disputed thereafter and the dispute is completed within any required period of time.

As described above, the preset criteria sets forth the characteristics of incoming ACH transactions for which the account holder is to be notified. In this embodiment, the preset notification criteria in system 10 further prescribes the manner in which the account holder of the ACH transaction in question is to be notified. The account holder may be notified upon satisfaction of the preset criteria via one or more data output devices such as data output device 18. For example, the account holder may be notified through any conventional method, such as e-mail, fax, phone call with automated voice response and recognition system, short message service (SMS) text, or combinations thereof, and to multiple parties. In this embodiment, the ACH transaction in question will be suspended while the account holder is notified that an incoming ACH transaction has satisfied the preset criteria. In other embodiments, the account holder may elect to be notified of an incoming ACH transaction that satisfies the preset criteria but further elect that the transaction is not to be suspended.

In some embodiments, the account holder will receive an indication within the notification of the particular preset criteria which was satisfied by the characteristics of the ACH transaction in question, and may choose different notification methods depending on which of the preset criteria is satisfied. For example, if the preset criteria for a certain SEC code is satisfied, the account holder may choose to be notified through e-mail, whereas if a certain threshold value is exceeded, the account holder may elect to be notified via SMS. It should be understood that in some embodiments of the invention the notification feature may be limited by the RDFI as necessary, for example, to reduce the burden or expense of operating a system such as system 10. However, the means of communication are not limited to any particular methods or devices. Considering the rapid advances in technology, any communication devices or methods may be employed as necessary to notify the account holder within any applicable time limits.

The account holder's response to the notification of an ACH transaction satisfying the preset criteria is received by a data input device such as data input device 16 associated with system 10 in step 118. In some embodiments, the response is provided via the same method as the notification. For example, if using SMS, the account holder may reply with to the question of whether to dispute the ACH transaction or not by an SMS text of either "yes" or "no." If using a phone call with an automated voice response and recognition system, then the account holder may speak their response or indicate by touch tone, that is, by pressing certain buttons on a touch tone phone. If account holders elect to receive an e-mail notification of an incoming suspended ACH transaction which may appear as follows:

| | |
|---|---|
| Account#: | YYYY3401 |
| Amount: | $100.00 (Debit/Credit) |

Company: ABC Insurance

Effective Date: 1/1/08

Respond By: 5:00 p.m. 1/1/08 to prevent posting (Absolute deadline for returning item as unauthorized expires 5:00 p.m. 2/28/08)

□ Accept □ Reject

In this example, if reject is selected, a message may also appear or sent via email thereafter in accordance with the rules regarding rejecting or "returning" ACH transactions. The rules regarding returns of ACH transactions may vary depending on the characteristics relating to the transaction itself, such as the SEC code.

In some embodiments, the account holder may not be required to approve the ACH transaction in order for the transaction to proceed, but rather must affirmatively reject or decline the ACH transaction for it to be suspended. In this embodiment, system 10 may allow the transaction to proceed if the account holder does not reject within a preset period of time. If the account holder responds by approving the transaction or does not decline the ACH transaction in question in step 120 within the preset period of time, then in step 122 the ACH transaction is released to a financial institution for posting or processing against the account of the account holder involved in the ACH transaction. The preset period of time may be the same for each ACH transaction or varying depending on the characteristics of the ACH transaction or the type of account holder involved, that is, whether the account holder is a business entity or individual. Once the transaction is permitted to proceed, the ACH transaction file may be accessed from database 12 or the centralized warehouse. The ACH file may be in the appropriate ACH transaction format or otherwise made ready for import to the core banking system associated with the RDFI. The RDFI may retrieve the file for posting and forward to the ACH operator as necessary.

In some embodiments, if the account holder response affirmatively allows the ACH transaction, the account holder may also be asked whether they would like to accept the ACH transaction singularly, or be provided with the option to indicate acceptance of further ACH transactions having similar characteristics. For example, the account holder may indicate that transactions from the same source should be automatically allowed in the future. In some embodiments, the account holder may indicate that transactions involving the same monetary amount or similar amounts, or any other of the characteristics associated with ACH transactions determinable in step 104, should be automatically allowed. If the account holder selects such options, then the account holder's preset notification criteria will be updated in database 12 accordingly.

In the embodiment shown in FIG. 3, system 10 poses the additional query to the account holder as to whether the source or originator from which the ACH transaction derives should be added to the account holder's approved originator list in step 124. The query may be provided to the account holder via a data output device such as data output device 18 or any of the communication methods and systems described herein. If the account holder indicates that the originator should be listed as automatically approved, then the account holder's preset notification criteria in database 12 is updated by control program 20 accordingly in step 126. If the account holder does not indicate that the originator should be on the approved list then no changes are made as shown in step 128. The response to this query may be received by the data input device 16 or any other data input devices associated with system 10.

In some embodiments, the account holder may place an originator on an approved list while still electing to be notified if certain criteria are satisfied in relation to that originator, such as the frequency or monetary amount of ACH transactions within a given time period. The present notification criteria would be changed accordingly, and the account holder would not be notified of ACH transactions involving the approved originator unless the notification criteria were met.

If the account holder declines the ACH transaction in step 120, then the ACH transaction will remain suspended in the centralized warehouse or database 12 and the account holder will be provided with a WSUPP form or otherwise be able to dispute the transaction in step 130 using any other appropriate form. In some embodiments, the account holder may provide a reason for declining the transaction, such as for example, unauthorized, improper, incorrect, ineligible, stop payment or revoked. System 10 may also be configured to require an affirmative response as to the reason for declining the transaction and confirmation thereof using a valid authentication code to comply with applicable law.

The following is an example of a current version of a WSUPP form which can be automatically provided to an account holder by some embodiments of the invention via data output device 18 or using a data entry screen through a graphical or telephonic, VRU user interface. In this example, the WSUPP is based on the rejection of a PPD by the account holder. The account holder may be required to complete and submit the entire WSUPP form in some embodiments of the invention. However, some embodiments of the invention may be configured to include user-friendly prompts to assist the account holder in entering information required by NACHA rules based on the type of ACH transaction.

For example, in a first field, the account holder may be provided with the following options:

I understand that I am submitting a written statement under the penalty of perjury as allowed under the electronic signature Act.

□ I agree

□ I disagree

If "I disagree" is elected in the above field, the following message may appear:

*This transaction will be/has been posted to your account. Please select I agree to automate the dispute process or select provide contact information and call your financial institution if you have questions or concerns.*

□ I agree

□ Please provide contact information

If "I agree" is elected in the field above or in the first field, the following may appear:

*I state that I have examined the attached statement or other notification from (Financial institution Name) indicating that an ACH debit entry was charged to my Account#YYYY3401, on Date in the amount of $________, and that the debit was unauthorized or improper.*

*For unauthorized entries, I further state that: (check one)*

☐ *I did not authorize, and have not ever authorized, __________(company name) to originate one or more ACH entries to debit funds from any account at (Bank name)*

☐ *I authorized (Company Name) to originate one or more ACH entries to debit funds from my account, but I revoked that authorization by notifying __________in the manner specified in the authorization on ______________.*

☐ *I authorized __________to originate one or more ACH entries to debit funds from an account at (Bank Name) but*

☐ *The amount debited exceeds the amount I authorized to be debited. The amount I authorized is $__________*

*Or*

☐ *The debit was made to my account on a date earlier than the date on which I authorized the debit to occur. I authorized the debit to be made to my account on or no earlier than __________(Date)*

The account holder may enter information in the appropriate fields in any conventional manner, such as by depressing a graphical representation of a button on a graphical user interface or by keying information into a telephonic VRU, and then submit the completed form electronically. In some embodiments, system 10 requires submission, acceptance and confirmation in compliance with various regulations, such as the Electronic Signatures in Global and National Commerce Act (ESIGN).

The WSUPP form and corresponding dispute process is the current method for disputing ACH transactions. It should be readily apparent that it is within the scope of system 10, and any other systems and methods described herein, to support any other dispute process involving ACH transactions or electronic transactions generally. For example, system 10 may be configured to provide account holders with the form known as the Written Statement of Unauthorized Debit pursuant to possible rule changes regarding ACH transactions. Thus, system 10 is not limited to the currently required procedures, regulations and WSUPP form, but may be configured to support any future dispute process for ACH transactions should there be changes to the current procedures and/or WSUPP form.

The manner in which the WSUPP form is provided to the account holder in step 130 may vary depending at least partially on the way in which the dispute process was initiated by the account holder, among other things. For example, if the account holder initiated the dispute process by e-mail, then the account holder may be provided with a hyperlink connection to an electronic version of the WSUPP form. Alternatively, the notification e-mail may include a WSUPP from which may be submitted along with the account holder's response, assuming that response is not an approval. If the account holder is notified by SMS, then the account holder may be directed to a website or receive an e-mail with a hyperlink directing the account holder to a website from which a WSUPP form may be completed. It should be readily apparent that system 10 can be configured to provide a variety options which facilitate the dispute process according to the applicable rules while also providing convenient features for the account holder and RDFI.

If the WSUPP form, or other required procedure, is completed in step 132, then either the ACH transaction file or a return file is returned to the ACH operator via data output device 18 and the appropriate parties are notified of the dispute in step 134. System 10 may also maintain records and track all disputes initiated by the account holders, which may be stored in database 12. In some embodiments, the account holder will be provided with a limited amount of time to complete the WSUPP form (or other vehicle for formalizing the dispute process) after declining the ACH transaction in question, according to any applicable rules. The period for response will be communicated to the account holder by system 10 so that the account holder is well aware of the obligation to meet this deadline.

As shown in step 136, if the period for responding has not expired, system 10 continues to wait for the form to be completed in step 132. If the time for finalizing the WSUPP form has expired, then in step 138 the ACH transaction will be removed from its suspended state. A return file will be prepared by system 10 for the RDFI to use for posting against the account of the corresponding account holder and forwarding to the ACH Operator. In some embodiments, if the account holder completes the dispute initiation process after the deadline, then the account holder will be notified that the time for responding has expired and instructed to contact their financial institution (the RDFI) directly if they wish to dispute the debit.

If the transaction was declined and the WSUPP form completed prior to the expiry of the applicable time period, the completed WSUPP form will be stored in database 12. A return item or file may be automatically generated by system 10 using the appropriate return reason code, if applicable, and transmitted via data output device 18 in the appropriate ACH format to the RDFI and/or ACH operator. Examples of return reason codes include codes for issues such as unauthorized debit, authorization revoked by consumer, and payment stopped.

System 10 may also automatically prepare and provide return files on any ACH transactions that proceed, including affirmatively authorized transactions, as may be required by applicable rules to the RDFI. In such embodiments, a RDFI may receive and process the account holder's ACH transaction posting file or debit processing instructions as provided in the file release instructions by system 10 via data output device 18. For example, the ACH transaction file release instructions may show that the account holder affirmatively authorized the transaction or did not decline the transaction within the given time period. In this case, the RDFI will receive the posting file and allow the ACH transaction to proceed. If the file shows that the account holder had declined the transaction, then the RDFI receiving the file will not allow the transaction to proceed. The return file may be transmitted to the ACH operator in both cases, that is, whether the transaction proceeds or is declined from the RDFI. An ACH operator that receives an ACH return file will typically forward the information to the ODFI without interference. If the ACH transaction was authorized by the account holder, then the ODFI will not request a WSUPP and the process will end. If the return file reveals that the account holder has declined the ACH transaction, then the ODFI will likely request the corresponding completed WSUPP form. In some embodiments, the preparation of files for communication is handled by data processors 14 and program 20.

The ODFI request will be received by data input device 16 of system 10 which may be residing at the RDFI, or the portion of system 10 hosted at the RDFI which is also configured for receiving such requests. Upon receipt, the completed WSUPP relating to the ACH transaction in question which was received by system 10 and stored in database 12 in step 134 will be located. A copy of the WSUPP form may then be forwarded to the ODFI via data output device 18, upon permission being granted by the RDFI, if such permission is necessary. If a WSUPP from has not been completed, system 10 will track the date and time of the ODFI request and send reminders to the RDFI and account holder as necessary.

The RDFI may additionally request proof of the account holder's authorization from the ODFI, via a requested authorization for receipt form or other applicable form. System 10 is configured to forward the appropriate request as well as track the date and time of actions taken in the matter, such as the ODFI request for a WSUPP, in order to send reminders to the ODFI or others regarding deadlines for further responses and obligations under the NACHA rules.

In some embodiments, a system 110, which is similar to system 10, is discussed generally below, and also referred to hereinafter as the "ACH Alert" system. The ACH Alert system comprises an Internet or web-based service which can be utilized by financial institutions and/or their third party processors to offer ACH fraud protection to account holders (such as corporations and consumers) through graphical user interfaces or "screens," and may be configured similarly to system 10 and include components as shown in FIG. 1.

As mentioned above with regard to system 10, part or all of the functionality of the ACH Alert system and core components may be located at one site, such as the offices of the third party processor for example. Alternatively, the ACH Alert system may be a fully hosted application operated by an independent entity offsite and made available to a third party processor through conventional hosting methods.

Although financial institutions may be the primary commercial account holder and user of the ACH Alert system, individual account holders that maintain accounts with the financial institution may also be provided access to their individual accounts and features of the ACH Alert system if permitted by their financial institution. Thus, the ACH Alert system may be configured to support a multi-tier structure of one or more relationships with third party transaction processors, financial institutions, and account holders. It should be understood that a third party processor as described herein may be an independent entity, subgroup or wholly owned subsidiary of a financial institution or other business to whom financial institutions outsource their core processing needs.

The ACH Alert system can provide support for multiple third party transaction processors, with multiple financial institutions associated with each third party processor and multiple account holders under each financial institution. Each third party transaction processor may maintain transaction records in their own tables/database which may be inaccessible by unauthorized users as set by the processor. The ACH Alert system may incorporate industry standard security measures, such as multi-factor authentication where applicable, strong passwords, changing passwords, or other security measures known in the art, as well as using encryption and security techniques to secure sensitive data in the database and transmit data between the parties and the ACH Alert system.

The ACH Alert system may support three different processing levels, each of which may be linked together in a database for the third party processor, financial institution and account holder, as in a "grandparent, parent, child" relationship, while having varied access to different features of the system. The ACH Alert system can be configured to allow third party processors to define and set specific user roles and privileges for account holders and/or financial institutions that make use of the system. The ACH Alert system may also support user audit and tracking capability for third party processors. Access by account holders may be obtained through any secure method, such as manual entry of identification and password information, contract number or by a trusted authentication from a third party application for example.

In some embodiments, the ACH Alert System includes user-friendly features, such as a wizard-type set up or online help features explaining the use of each field as well as a complete tutorial customized for each type of user, including the third party processor, financial institution and account holder, depending on their respective needs and use of the system. It should also be understood that the system may include various screen interfaces for accessing the system, and such interfaces may differ depending on whether the accessing party is a third party processer, financial institution or account holder. In some embodiments, notifications may include e-mails with a URL or hyperlinks to sites that illustrate the account holder's account, the ACH transaction in question, among other things, and allow the account holder to immediately authorize or complete the appropriate dispute forms, as necessary.

As described above, the ACH Alert system allows third party processors to offer and/or support the ACH Alert system to their financial institution clients if desired. For example, the processor may manage system features such as providing for the entry and validation of the third party processor routing number and name, specifying which financial institutions are subscribing or participating in the ACH Alert system, defining incoming and outgoing formats, and specify discreet or comingled file acceptance. The processor can also grant financial institutions with the ability to customize access levels for their own account holders if desired.

Some of the functions available to third party processors further include: supporting entry of the processor's Electronic Transaction Identifier (ETI) and/or routing number and name, which uniquely identifies the processor in the database; defining the ACH file type they will load to the system and the format; defining the specific format of ACH file they need the system to build to feed into their core system; and supporting the automatic creation of general ledger entries for account balancing purposes.

A third party processor may either use the ACH Alert system to set for themselves or provide the financial institutions with capabilities such as, setting the default suspend, posting, or notification rules or other variables. Thus, the third party processor may allow only certain preset notification criteria pertaining to incoming transactions to be elected, either by the financial institutions or account holders. The third party processor may also give the financial institution the option to defer the selection of such variables or other rules to the subscribing account holders themselves. A third party processor may also either maintain for themselves or provide the financial institutions with control over options relating to the preset notification criteria, such as which characteristics ACH transactions may be identified by or which notification methods are permitted. The financial institution may also be allowed to set certain parameters, such as the appropriate WSUPP return deadline, so long as it maintains within applicable regulations, and customize the period of time the transaction is suspended, such as by a specific time of day or number of hours from the transaction time or file loading time.

For example, NACHA rules allow a corporate account holder up to two (2) days from the settlement date to dispute unauthorized transactions and the consumer account holder has sixty (60) days from the settlement date to dispute unauthorized transactions. A financial institution may want to modify these timelines in the ACH Alert system to allow adequate time to send back to the ACH Operator based on their processing routines. A financial institution can also use the system to place controls on the number of unauthorized transactions that can be returned by a single account holder within a set period. The third party processor may choose to allow the financial institutions to customize such options.

The financial institutions may also make use of the system to configure various rules for transaction handling/parsing prior to notification for all subscribing account holders. For example, a third party processor may permit a financial institution to send automated pre-note notifications, suspend posting of ACH transactions for all subscribing account holders, and warehouse them until a preset deadline but before posting to an account.

The ACH Alert system may also allow for the posting of incoming ACH transactions to accounts but permit the account holder to dispute the transaction within a preset period of time, in which case the funds will be credited to the account if a dispute is initiated within time. As mentioned above, some financial institutions may want to notify their account holders for transactions that carry specific SEC codes, or for what they deem to be higher risk transactions. The system further provides third party processors with the ability to allow financial institutions to make general ledger entries automatically, and balance files or entries where applicable.

In some embodiments, the system default is to require a consumer account holder to electronically complete a WSUPP before an ACH transaction dispute is returned to the ACH operator by the system. The third party processor may permit the financial institution to override this requirement and allow an account holder to execute a disputed return without having already completed the WSUPP. The system may then notify the appropriate parties of all transactions that have been returned as disputed and for which the WSUPP has not been completed. The third party processor or financial institution may configure the system so that privileges are suspended for account holders who have not completed the WSUPP form, or followed other dispute procedure, within a preset period of time from initiating a dispute.

Account holders using the ACH Alert system may be allowed by either the third party processor or the financial institution to access the system and set their own preset criteria rules, as well as maintain and edit their profiles using any suitable secure access method, such as contract number or a user identification and password. In some embodiments, account holders are granted access to the ACH Alert system through an existing online banking system used with their financial institution, and the two systems are virtually indistinguishable. In other embodiments, account holders may access the ACH Alert system independently of their online banking system.

A third party processor of financial institution may typically allow the ACH Alert system to provide the account holder with the capability to select their own preset notification criteria for ACH transactions and multiple methods of notification (and multiple contacts under each method of notification), depending on the particular transaction, or in other words, the particular preset criteria satisfied. The options may include such elections as "all debits," or relate to specific originators, the amount of money involved or standard entry class (SEC) code.

For example, it is envisioned that account holders may initially choose to be notified by the ACH Alert system for all incoming ACH transactions, which may be accomplished by selecting the "all debits" option. The ACH Alert system will maintain a record or history of payments which are stored in an associated database, such as database 12. Upon receiving notification of incoming transactions, the account holder may access the system and select the entities involved in the transactions which are to be automatically authorized in the future. The account holder may also choose to be notified of incoming ACH transactions without simultaneously suspending the transaction.

The ACH Alert system may provide for a variety of management functions relating to the ACH transaction files, such as parsing of files, filtering and warehousing of files, and the building or rebuilding of files, among other things. The ACH Alert system may also return files to the ACH Operator if the entries are rejected, and create of account or banking offsets for transactions that have posted but the return deadline has not expired.

The system may also provide for automated electronic exchange of the WSUPP, authorization request and proof of authorizations between participating depository financial institutions (ODFI's and RDFI's) with a tickler system to notify a financial institution if they are nearing the deadline to respond to an inquiry. The system can also be configured to generate a series of balancing reports covering a variety of subjects, such as suspended items, approved items, no response items, and rejected items.

Some embodiments may include what is referred to as a centralized warehouse, which can be embodied by an internal or external database, among other things. The warehouse can accept and store eligible information generated by the application of the system of some embodiments of the invention as well as responses from the financial institutions, either on-site in a host system or via communication to an external database. The warehouse can further be configured to release ACH transaction files for retrieval processing by the applicable financial institutions at the suspend deadline.

In some embodiments, upon the ACH transaction either being authorized or expiry of the relevant suspension deadline for indicating a dispute or completing the dispute form, the ACH Alert system will prepare ACH transaction files in the appropriate format, such as return and posting files, for the RDFI's to incorporate into their core banking system and forward to ACH operators, as necessary.

Although the system and methods described herein involve the transfer of files, data and communication, it should be understood that various portions or components of the system and methods described herein may be located in one or a plurality of different locations, while still functioning seamlessly through, for example, conventional methods of wired or wireless electronic communication. Embodiments discussed herein, or features and portions thereof, may also be provided in a computer program product, such as those which incorporate computer usable medium for various operative features and portions thereof, such as portable media and devices capable of storing computer readable data and software, downloadable data and software, pre-loaded data and software and Internet-based applications, among other things.

Some embodiments may also incorporate sending advertising or promotional information relating to a variety of subjects, such as programs and benefits offered by the account holder's financial institution, which may be transmitted to account holders subscribing to the system described herein through the notification preferences set forth by each account holder in their respective preset notification criteria.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. Various features and advantages of the disclosure are set forth in the following claims.

We claim:

1. A method of protecting account holders of financial accounts against a fraudulent transaction communicated to a Receiving Depository Financial Institution (RDFI) within the Automated Clearing House (ACH) Network, comprising the steps of:

receiving through a data communication device operatively enabled for communication within the ACH Network an ACH transaction file including transaction data transmitted within the ACH Network, the data communication device being in communication with a processor, client communication device and memory;

the processor facilitating the extraction and identifying of a transaction characteristic of an underlying financial ACH transaction file involving a financial account maintained by the RDFI, wherein the transaction characteristic is identifiable by processing the transaction data contained in the ACH transaction file;

the processor facilitating the comparing of the transaction characteristic with a preset notification criterion stored in the memory in association with the financial account, the preset notification criterion setting forth (i) a characteristic of any financial transaction that satisfies the preset notification criterion and (ii) a remote client device;

responsive to the preset notification criterion being satisfied by the transaction characteristic, transmitting a communication to the remote client device stored in memory, wherein the communication comprises a returnable response, the returnable response being configured to enable the selection of one or both of (i) an approval of the underlying financial transaction and (ii) an approval of subsequent financial transactions including the transaction characteristic, wherein the selection is transmitted from the remote client device to the data communication device; and responsive to the data communication device receiving the returnable response, the processing device facilitating one or both of (i) recording the approval of the underlying financial transaction and (ii) changing the preset notification criterion stored in memory, whereby the subsequent transactions including the transaction characteristic will not satisfy the preset notification criterion.

2. The method according to claim 1, further comprising the step of:

suspending the underlying transaction if the preset notification criterion is satisfied by the transaction data, wherein suspension prevents the underlying transaction from being finalized and the suspending step is facilitated by one or more data processing devices.

3. The method according to claim 2, further comprising the step of:

unsuspending the underlying transaction upon receiving the returnable response.

4. The method according to claim 1, further comprising the steps of:

receiving an election of the preset notification criteria from one of the account holders through the data communication device, wherein the election includes one or more preset notification criterion relating to characteristics of financial transactions that involve an account in a financial institution;

the processing device comparing the transaction data contained in the ACH transaction file with the preset notification criteria elected by the account holder; and the processing device determining whether an underlying transaction received as a ACH transaction filed by the data communication device involves one of the account holders from which an election of the preset notification criteria has been received.

5. The method according to claim 1, wherein the preset notification criterion enables one of (i) enabling the underlying transaction to post to the financial account prior to the data communication device receiving the returnable response or (ii) suspending the underlying transaction from posting to the financial account prior to the data communication device receiving the returnable response.

6. The method according to claim 1, wherein the returnable response is further configured to be actuate a dispute of the underlying financial transaction.

7. The method according to claim 1, wherein the transaction data comprises at least one of the amount of money involved in the underlying financial transaction, an account identification, one or more of the parties involved in the underlying financial transaction and a Standard Entry Class (SEC) code associated with the transaction.

8. A system of protecting account holders against fraudulent Automated Clearing House (ACH) Network transactions originated and transmitted to financial institutions through the ACH Network, the system comprising:

a client server in communication with remote client devices and the ACH Network;

memory to store a preset notification criteria for an account holder relating to a transaction characteristic of a financial transaction, wherein the transaction characteristic is identifiable in a transaction data associated with an ACH transaction file generated by an ACH operator;

a data processing device configured to analyzing the ACH transaction file received by the client server through the ACH Network, the data processing device identifying the transaction characteristic in the data and the account holder associated with the ACH transaction file and comparing the transaction data with the preset notification criteria stored in memory; and a data communication device operatively associated with the client server, the data communication device being configured to transmit a notification to a remote client device associated with the account holder responsive to the transaction data satisfying the preset notification criteria, wherein the electronic notification is transmitted independently of the ACH Network and the notification comprises a returnable response generated by the data processing device enabling the selection of one or both of (i) an approval of the financial transaction and (ii) an approval of subsequent financial transactions including the transaction characteristic;

wherein responsive to the data communication device receiving the returnable response, the data processing device facilitating one or both of (i) recording the approval of the underlying financial transaction and (ii) changing the preset notification criterion stored in memory, whereby the subsequent financial transactions including the transaction characteristic will not satisfy the preset notification criterion for the account holder.

9. The system of claim 8, wherein the data processing device is further configured to suspend the underlying transaction responsive to the preset notification criteria being satisfied, wherein suspension prevents the underlying transaction from posting to a financial account.

10. The system of claim 8, wherein the returnable response further comprises a selection to actuate a dispute of the underlying financial transaction.

11. The system of claim 10, wherein the data processing device is further configured to suspend the underlying transaction responsive to receiving the selection to actuate the dispute.

12. A computerized method of protecting a set of account holders against fraudulent proposed Automated Clearing House (ACH) Network transactions involving financial accounts at a Receiving Depository Financial Institution (RDFI), the method being facilitated by a server including a processing device in communication with memory including executable instructions, the server further including a data communication device in communication with remote devices and the ACH Network, the method comprising the steps of:

receiving through the data communication device, an ACH transaction file transmitted within the ACH Network, the data communication device being in communication with a processor, client communication device and memory;

the processor facilitating the identifying of a transaction characteristic of an underlying financial transaction involving a financial account maintained by the RDFI, wherein the transaction characteristic is identifiable by processing the transaction data contained in the ACH transaction file;

responsive to the determination that the financial account is associated with one account holder of the set of account holders from which a preset notification criterion has been stored in memory, the processor further facilitating the comparing of the transaction characteristic with the preset notification criterion stored in the memory in association with the financial account, the preset notification criterion setting forth (i) a characteristic of any financial transaction that satisfies the preset notification criterion and (ii) a remote client device; and responsive to the preset notification criterion being satisfied by the transaction characteristic, transmitting a communication to the remote client device stored in memory, wherein responsive to the data communication device receiving a response to the communication, the processing device facilitating at least one of: (i) preventing the underlying financial transaction; (ii) recording an approval of the underlying financial transaction; and (iii) recording an approval of the underlying financial transaction and changing the preset notification criterion stored in memory, whereby subsequent financial transactions including the transaction characteristic will not satisfy the preset notification criterion.

13. The method according to claim 12, further comprising the step of communicating the ACH transaction file to the RDFI responsive to the preset notification criterion not being satisfied.

14. The method according to claim 12, further comprising the step of:

suspending the underlying transaction responsive to the preset notification criterion being satisfied, wherein suspension prevents the underlying financial transaction from posting to the financial account.

15. The method according to claim 12, wherein the communication to the remote client device comprises a returnable response, the returnable response being configured to enable the selection of one or both of (i) approval of the underlying financial transaction and (ii) approval of subsequent financial transactions including the transaction characteristic.

16. The method according to claim 12, wherein the communication to the remote device further comprises an electronically returnable response configured to indicate a dispute of the underlying financial transaction.

17. The method according to claim 12, further comprising the step of receiving an election of the preset notification criteria from the one account holder through the data communication device, wherein the election includes one or more preset notification criterion relating to characteristics of financial transactions that involve an account in a financial institution.

* * * * *